United States Patent
Strope et al.

(10) Patent No.: US 11,527,248 B2
(45) Date of Patent: Dec. 13, 2022

(54) SPEECH RECOGNITION WITH PARALLEL RECOGNITION TASKS

(71) Applicant: Google LLC, Mountain View, CA (US)

(72) Inventors: Brian Strope, Palo Alto, CA (US); Francoise Beaufays, Mountain View, CA (US); Olivier Siohan, Glen Rock, NJ (US)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 16/885,116

(22) Filed: May 27, 2020

(65) Prior Publication Data
US 2020/0357413 A1    Nov. 12, 2020

Related U.S. Application Data

(63) Continuation of application No. 16/041,434, filed on Jul. 20, 2018, now Pat. No. 10,699,714, which is a (Continued)

(51) Int. Cl.
*G10L 15/32*    (2013.01)
*G10L 15/00*    (2013.01)
(Continued)

(52) U.S. Cl.
CPC ............. *G10L 15/32* (2013.01); *G10L 15/00* (2013.01); *G10L 15/01* (2013.01); *G10L 15/26* (2013.01)

(58) Field of Classification Search
CPC ......... G10L 15/32; G10L 15/00; G10L 15/01; G10L 15/26; G10L 15/30; G10L 15/34
See application file for complete search history.

(56) References Cited

U.S. PATENT DOCUMENTS 5,228,087 A    7/1993 Bickerton
5,432,886 A    7/1995 Tsukada et al.
(Continued)

FOREIGN PATENT DOCUMENTS

JP    2002-116796 A    4/2002
JP    2002-150039 A    5/2002
(Continued)

OTHER PUBLICATIONS

Mengusoglu, et al. Confidence Measures in HMMIMLP Hybrid Speech Recognition for Turkish Language Proceedings of the ProRISC/IEEE workshop pp. 413-418.
(Continued)

*Primary Examiner* — Fariba Sirjani
(74) *Attorney, Agent, or Firm* — Oblon, McClelland, Maier & Neustadt, L.L.P.

(57) ABSTRACT

The subject matter of this specification can be embodied in, among other things, a method that includes receiving an audio signal and initiating speech recognition tasks by a plurality of speech recognition systems (SRS's). Each SRS is configured to generate a recognition result specifying possible speech included in the audio signal and a confidence value indicating a confidence in a correctness of the speech result. The method also includes completing a portion of the speech recognition tasks including generating one or more recognition results and one or more confidence values for the one or more recognition results, determining whether the one or more confidence values meets a confidence threshold, aborting a remaining portion of the speech recognition tasks for SRS's that have not generated a recognition result, and outputting a final recognition result based on at least one of the generated one or more speech results.

12 Claims, 9 Drawing Sheets

Related U.S. Application Data continuation of application No. 15/171,374, filed on Jun. 2, 2016, now Pat. No. 10,049,672, which is a continuation of application No. 14/064,755, filed on Oct. 28, 2013, now Pat. No. 9,373,329, which is a continuation of application No. 13/750,807, filed on Jan. 25, 2013, now Pat. No. 8,571,860, which is a continuation of application No. 12/166,822, filed on Jul. 2, 2008, now Pat. No. 8,364,481.

(51) Int. Cl.
 *G10L 15/26* (2006.01)
 *G10L 15/01* (2013.01)

(56) References Cited

U.S. PATENT DOCUMENTS

| | | |
|---|---|---|
| 5,475,770 A | 12/1995 | Mittelbach et al. |
| 5,634,083 A | 5/1997 | Oerder |
| 5,754,711 A | 5/1998 | Shimizu et al. |
| 5,754,978 A | 5/1998 | Perez-Mendez et al. |
| 5,758,021 A | 5/1998 | Hackbarth |
| 5,781,887 A | 7/1998 | Juang |
| 5,799,279 A | 8/1998 | Gould et al. |
| 5,956,675 A | 9/1999 | Setlur et al. |
| 6,088,671 A | 7/2000 | Gould et al. |
| 6,098,043 A | 8/2000 | Forest et al. |
| 6,122,613 A * | 9/2000 | Baker ............... G10L 15/32 704/235 |
| 6,292,779 B1 | 9/2001 | Wilson et al. |
| 6,377,922 B2 | 4/2002 | Brown et al. |
| 6,526,380 B1 | 2/2003 | Thelen et al. |
| 6,574,595 B1 | 6/2003 | Mitchell et al. |
| 6,618,702 B1 | 9/2003 | Kohler et al. |
| 6,701,293 B2 | 3/2004 | Bennett et al. |
| 6,804,414 B1 | 10/2004 | Sakai et al. |
| RE38,649 E | 11/2004 | Setlur et al. |
| 6,829,578 B1 | 12/2004 | Huang et al. |
| 6,839,667 B2 | 1/2005 | Reich |
| 6,882,973 B1 | 4/2005 | Pickering |
| 6,898,567 B2 | 5/2005 | Balasuriya |
| 6,961,700 B2 | 11/2005 | Mitchell et al. |
| 6,963,841 B2 | 11/2005 | Handal et al. |
| 6,992,973 B2 | 1/2006 | Sakoda et al. |
| 6,993,482 B2 | 1/2006 | Ahlenius |
| 6,996,525 B2 | 2/2006 | Bennett et al. |
| 7,012,650 B2 | 3/2006 | Hu et al. |
| 7,032,099 B1 | 4/2006 | Imamura |
| 7,069,221 B2 | 6/2006 | Crane et al. |
| 7,076,428 B2 | 7/2006 | Anastasakos et al. |
| 7,197,331 B2 * | 3/2007 | Anastasakos ........... G10L 15/30 704/E15.047 |
| 7,203,646 B2 | 4/2007 | Bennett |
| 7,228,275 B1 | 6/2007 | Endo et al. |
| 7,340,395 B2 | 3/2008 | Gurram et al. |
| 7,469,406 B2 | 12/2008 | Barros |
| 7,496,514 B2 | 2/2009 | Ross et al. |
| 7,519,536 B2 | 4/2009 | Maes et al. |
| 7,620,549 B2 | 11/2009 | Di Cristo |
| 7,822,610 B2 | 10/2010 | Burns et al. |
| 7,881,928 B2 | 2/2011 | Gao et al. |
| 7,899,669 B2 | 3/2011 | Gadbois |
| 7,957,975 B2 | 6/2011 | Burns |
| 7,969,174 B2 | 6/2011 | Balog et al. |
| 8,015,007 B2 | 9/2011 | Sakai |
| 8,019,648 B2 | 9/2011 | King et al. |
| 8,024,321 B2 | 9/2011 | Muras |
| 8,036,890 B2 | 10/2011 | Catchpole |
| 8,185,400 B1 | 5/2012 | Goffin et al. |
| 8,255,219 B2 | 8/2012 | Braho et al. |
| 8,364,481 B2 | 1/2013 | Strope et al. |
| 8,407,050 B2 | 3/2013 | Kobal et al. |
| 8,812,325 B2 | 8/2014 | Burns et al. |
| 8,909,532 B2 | 12/2014 | Cross, Jr. |
| 9,009,695 B2 | 4/2015 | Unfried |
| 2002/0055845 A1 * | 5/2002 | Ueda ............... G10L 15/32 704/270 |
| 2002/0065656 A1 | 5/2002 | Reding et al. |
| 2002/0133346 A1 | 9/2002 | Kemble |
| 2002/0193997 A1 | 12/2002 | Fitzpatrick et al. |
| 2002/0194000 A1 * | 12/2002 | Bennett ............ G10L 15/32 704/270 |
| 2003/0028838 A1 | 2/2003 | Chang et al. |
| 2003/0040907 A1 | 2/2003 | Chang et al. |
| 2003/0115053 A1 | 6/2003 | Eide et al. |
| 2003/0125945 A1 | 7/2003 | Doyle |
| 2003/0125951 A1 | 7/2003 | Bartosik |
| 2003/0144837 A1 | 7/2003 | Basson et al. |
| 2003/0200085 A1 | 10/2003 | Nguyen et al. |
| 2004/0054532 A1 | 3/2004 | Staiger |
| 2004/0083108 A1 | 4/2004 | Tachimori et al. |
| 2004/0138885 A1 | 7/2004 | Lin |
| 2004/0148154 A1 | 7/2004 | Acero et al. |
| 2004/0158468 A1 | 8/2004 | Baker |
| 2004/0210437 A1 | 10/2004 | Baker |
| 2005/0010422 A1 * | 1/2005 | Ikeda ............... G10L 15/30 704/277 |
| 2005/0050119 A1 | 3/2005 | Vandanapu |
| 2005/0065789 A1 | 3/2005 | Yacoub et al. |
| 2005/0091059 A1 | 4/2005 | Lecoeuche |
| 2005/0182628 A1 | 8/2005 | Choi |
| 2006/0009980 A1 | 1/2006 | Burke et al. |
| 2006/0036428 A1 | 2/2006 | Ramsey |
| 2006/0122837 A1 | 6/2006 | Kim |
| 2006/0149558 A1 | 7/2006 | Kahn et al. |
| 2006/0235686 A1 | 10/2006 | Jeong et al. |
| 2007/0001101 A1 | 1/2007 | Dow et al. |
| 2007/0136059 A1 | 6/2007 | Gadbois |
| 2007/0156411 A1 | 7/2007 | Burns et al. |
| 2007/0198261 A1 | 8/2007 | Chen |
| 2007/0198273 A1 | 8/2007 | Hennecke |
| 2007/0198979 A1 | 8/2007 | Dice et al. |
| 2007/0219941 A1 | 9/2007 | Schnurr et al. |
| 2007/0255552 A1 | 11/2007 | Thiesson |
| 2008/0077386 A1 * | 3/2008 | Gao ............... G10L 15/22 704/3 |
| 2008/0077402 A1 * | 3/2008 | Dhanakshirur ......... G10L 15/22 704/E15.04 |
| 2008/0082489 A1 | 4/2008 | Chen et al. |
| 2008/0147400 A1 | 6/2008 | Yu et al. |
| 2008/0243514 A1 | 10/2008 | Gopinath et al. |
| 2008/0243515 A1 | 10/2008 | Odinak |
| 2008/0270129 A1 | 10/2008 | Colibro et al. |
| 2009/0052636 A1 | 2/2009 | Webb |
| 2009/0150153 A1 | 6/2009 | Li |
| 2009/0222263 A1 | 9/2009 | Collotta et al. |
| 2009/0299724 A1 | 12/2009 | Deng et al. |
| 2009/0300017 A1 | 12/2009 | Tokusho et al. |
| 2010/0030560 A1 | 2/2010 | Yamamoto |
| 2010/0161572 A1 | 6/2010 | Daum et al. |
| 2010/0179979 A1 | 7/2010 | Kadashevich |
| 2011/0016140 A1 | 1/2011 | Fukada |
| 2011/0066433 A1 | 3/2011 | Ljolje et al. |
| 2011/0137648 A1 * | 6/2011 | Ljolje ............ G10L 15/285 704/231 |
| 2011/0238415 A1 | 9/2011 | Koll |
| 2011/0307241 A1 | 12/2011 | Waibel et al. |
| 2013/0073294 A1 | 3/2013 | Burns et al. |
| 2013/0080179 A1 | 3/2013 | White |
| 2014/0156901 A1 * | 6/2014 | Raichelgauz ......... G06F 9/28 710/305 |
| 2015/0071419 A1 | 3/2015 | Anderson |

FOREIGN PATENT DOCUMENTS

| | | |
|---|---|---|
| JP | 2004-258289 A | 9/2004 |
| JP | 2005-031758 A | 2/2005 |
| JP | 2005-524859 A | 8/2005 |
| JP | 2005-266192 A | 9/2005 |
| JP | 2013-160259 A | 8/2013 |
| KR | 2004-0010860 A | 2/2004 |
| KR | 2005-0030906 A | 3/2005 |

(56) References Cited

FOREIGN PATENT DOCUMENTS

| WO | 2003/058604 A1 | 7/2003 |
| WO | 2007/055766 A2 | 5/2007 |
| WO | 2010/003109 A1 | 1/2010 |

OTHER PUBLICATIONS

Weintraub, et al. "Neural-Network Based Measures of Confidence for Word Recognition" Proc. ICASSP '97, Munich, Germany, vol. 2, pp. 887-890.
International Search Report for Application No. PCT/US2009/049604, dated Dec. 30, 2009, 11 pages.
EPO Communication for Application No. 09774558.2, dated May 15, 2012 (3 pages).
Notice of Reasons for Rejection issued in Japanese Application No. 2013-268860 dated Feb. 23, 2015, 4 pages (with English translation).
Office Action issued in Korean Application No. 10-2011-7002709 dated May 26, 2015, 10 pages (with English translation).
Office Action issued in Japanese Application No. 2013-268860 dated Jan. 4, 2016, 10 pages (with English abstract).
Office Action issued in Chinese Application No. 201310582554.2 dated Feb. 29, 2016, 22 pages (with English translation).

* cited by examiner

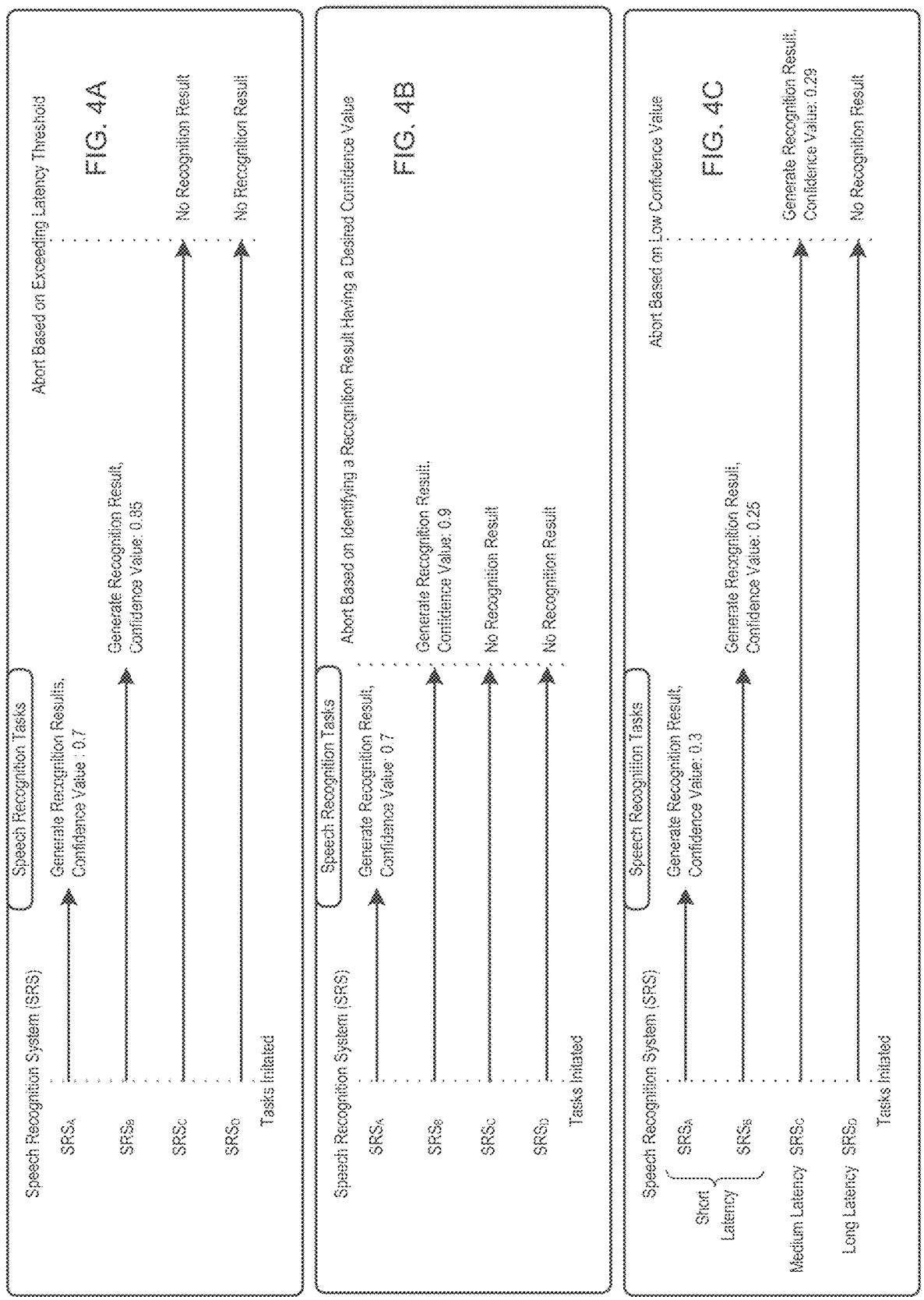

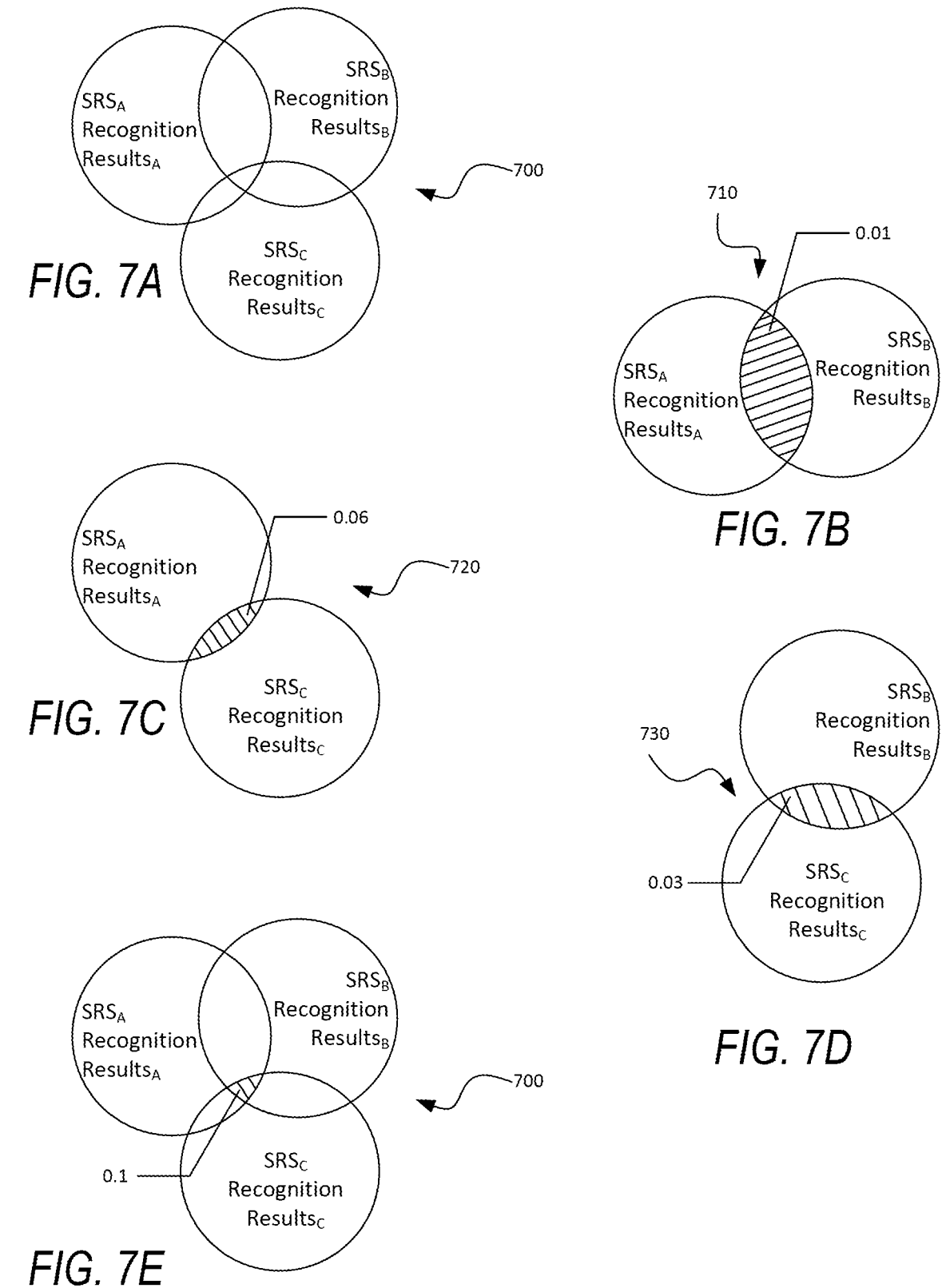

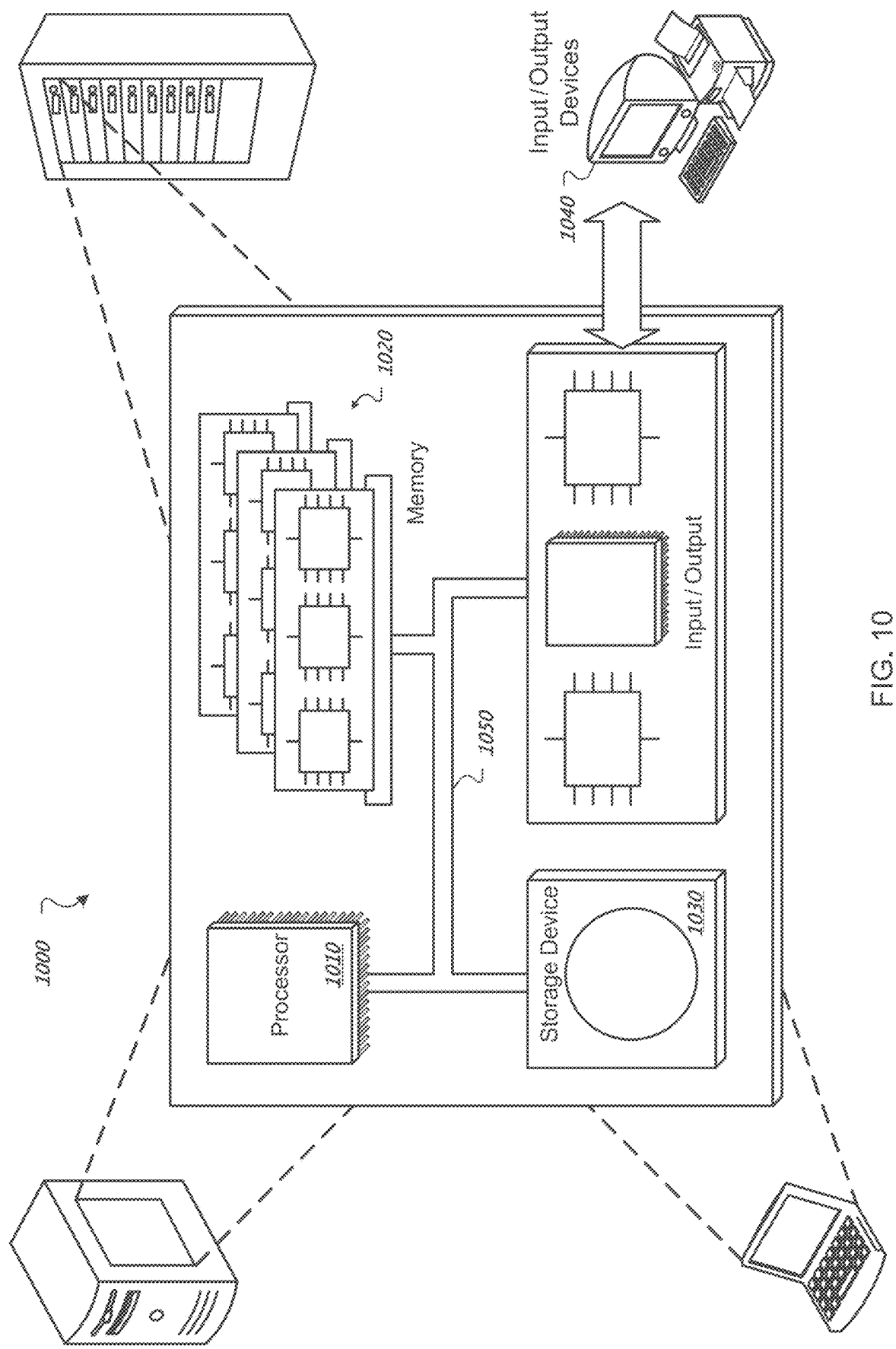

SPEECH RECOGNITION WITH PARALLEL RECOGNITION TASKS

CROSS-REFERENCE TO RELATED APPLICATIONS

This patent application is a continuation of, and claims priority under 35 U.S.C. 120 from, U.S. patent application Ser. No. 16/041,434, filed on Jul. 20, 2018, which is a continuation of U.S. patent application Ser. No. 15/171,374, filed on Jun. 2, 2016, which is a continuation of U.S. patent application Ser. No. 14/064,755, filed on Oct. 28, 2013, which is a continuation of U.S. patent application Ser. No. 13/750,807, filed Jan. 25, 2013, which is a continuation of U.S. patent application Ser. No. 12/166,822, filed on Jul. 2, 2008. The disclosures of these prior applications are considered part of the disclosure of this application and are hereby incorporated by reference in their entireties.

TECHNICAL FIELD

This instant specification relates to speech recognition.

BACKGROUND

Many applications benefit from receiving input in the form of voice commands or queries. This is especially true for applications running on mobile devices, such as cell phones, where entering input through a small keypad or other device manipulated by a user's fingers may be difficult due to the reduced size of the device. Similarly, if a mobile device is used to access an application running on another device (e.g., an email server, a map/directions server, or a telephone directory server), transmitting voice commands to the application instead of entering the commands through a small keypad, etc, may be much easier for the user.

In order for an application to act on verbal input, a speech recognizer can convert the verbal input into symbolic representations for use by the application. Some current speech recognizers may use a single recognition system that attempts to identify possible speech within the verbal input. Use of a single speech recognition system may limit the accuracy of the speech identification to the accuracy associated with the single speech recognition system. Other current speech recognizers may use sequential speech recognitions, where two or more passes are performed on the verbal input to determine what speech is most likely represented by the verbal input. The use of multiple passes may increase the time required to generate a final speech recognition result.

In yet other current speech recognizers, multiple speech recognition systems can each completely process the verbal input and then the output results. This use of multiple speech recognition systems also may increase the time required to generate a final result because the length of the processing time is determined by the slowest speech recognition system (and/or by the slowest computers executing the speech recognition algorithms).

SUMMARY

In general, this document describes recognizing speech using multiple speech recognition systems (SRS's) in parallel, but aborting some before completion if the generated recognition result(s) meet a desired threshold. For example, each SRS may have a different latency and accuracy in performing speech recognition tasks. If SRS's with a lower latency output a speech recognition result and a confidence value expressing a high confidence in the result, speech recognition tasks executed by the remaining SRS's can be aborted. If the confidence value is too low relative to a confidence threshold, more SRS's may be permitted to generate results. If these results meet a confidence threshold, the SRS's that still have not completed the speech recognition task may be aborted and so on.

In a first general aspect, a computer-implemented method is described. The method includes receiving an audio signal and initiating speech recognition tasks by a plurality of speech recognition systems (SRS's). Each SRS is configured to generate a recognition result specifying possible speech included in the audio signal and a confidence value indicating a confidence in a correctness of the speech result. The method also includes completing a portion of the speech recognition tasks including generating one or more recognition results and one or more confidence values for the one or more recognition results, determining whether the one or more confidence values meets a confidence threshold, aborting a remaining portion of the speech recognition tasks for SRS's that have not generated a recognition result, and outputting a final recognition result based on at least one of the generated one or more speech results.

In a second general aspect, a system is described that includes a plurality of speech recognition systems that initiate speech recognition tasks to identify possible speech encoded in a received audio signal. Each speech recognition system (SRS) is configured to generate a recognition result and a confidence value indicating a confidence in a correctness of the recognition result. The system also includes a recognition managing module to receive recognition results as the recognition results are generated by the SRS's and to receive confidence values associated with the generated recognition results. The recognition management module aborts uncompleted speech recognition tasks by SRS's that have not generated recognition results if one or more of the received confidence values meets a confidence threshold. The system includes an interface for transmitting a final recognition result selected based on the confidence values of the generated recognition results.

In a third general aspect, a system is described that includes a plurality of speech recognition systems that initiate speech recognition tasks for a received audio signal—each speech recognition system (SRS) configured to generate a recognition result identifying possible speech within the audio signal and a confidence value indicating a confidence in a correctness of the recognition result. The system includes means for receiving one or more recognition results and one or more corresponding confidence values from each SRS as the one or more recognition results are generated by the SRS, aborting uncompleted speech recognition tasks by SRS's that have not generated recognition results if one or more of the received confidence values meets a confidence threshold, and selecting a final recognition result based on the confidence values of the generated recognition results. The system also includes an interface for transmitting a final recognition result that represents possible speech within the audio signal.

The systems and techniques described here may provide one or more of the following advantages. First, a system using multiple speech recognition systems to decode audio in parallel can provide improved join optimization of latency and accuracy in that it may permit unfinished recognition tasks to be aborted if satisfactory results are received. Additionally, a system using multiple recognition systems can improve rejection rates (i.e., decrease the rates). A system may also increase accuracy by comparing recognition results output by multiple recognition systems. A framework for scaling (e.g., increasing) an amount of computation resource used to provide increasing recognition performance may also be provided.

The details of one or more embodiments are set forth in the accompanying drawings and the description below. Other features and advantages will be apparent from the description and drawings, and from the claims.

DESCRIPTION OF DRAWINGS

FIGS. 4A-C show diagrams illustrating execution of example speech recognition tasks.

FIGS. 7A-E are Venn diagrams shown example recognition result sets output by SRS's and correlations between the sets, which may be used to weight the recognition results.

FIG. 10 is a block diagram of computing devices that may be used to implement the systems and methods described in this document.

Like reference symbols in the various drawings indicate like elements.

DETAILED DESCRIPTION

This document describes systems and techniques for using multiple speech recognition systems (SRS's) to decode an utterance. In some implementations, each of the SRS's have different characteristics such as accuracy, latency, dictionaries, etc so that some of the multiple SRS's output a recognition result before other SRS's. If the output recognition results satisfy certain requirements (e.g., one or more of the generated results are associated with a specified confidence value that meets or exceeds a threshold confidence), a speech decoding system can abort the remaining SRS's before they complete their speech recognition tasks.

Figure 1:
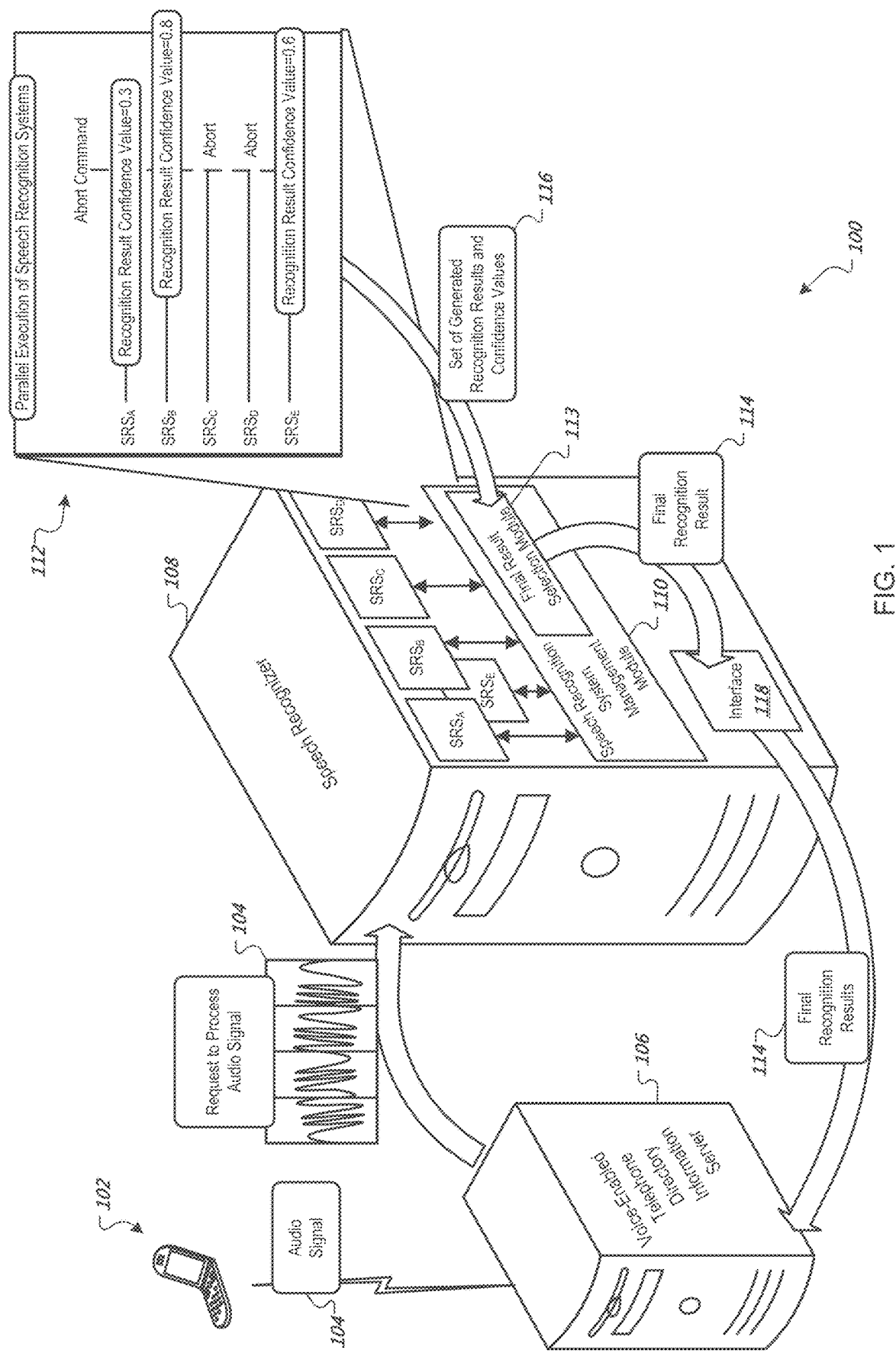
FIG. 1 is a diagram of an example system for recognizing speech.

FIG. 1 is a diagram of an example system 100 for recognizing speech. In general, the system 100 includes multiple SRS's that process a received audio signal from, for example, a cell phone. In this example, a user calls a voice-enabled telephone directory service that forwards an audio signal containing the user's voice to a speech recognizer that has the multiple SRS's.

The multiple SRS's can process the audio signal in parallel, but some SRS's may generate recognition results before other SRS's. If the SRS's that generate the recognition results express a high enough confidence in those results, the remaining uncompleted speech recognition tasks can be aborted and a final recognition result can be determined based on the currently generated recognition results instead of waiting for all of the SRS's to complete their speech recognition tasks.

The example system 100 includes a cell phone 102 that transmits voice input in the form of an audio signal 104 to a voice-enabled telephone directory information server 106, which permits a cell phone user to verbally request telephone directory information and responses with the requested information.

In the example of FIG. 1, the information server 106 transmits the audio signal 104 to a speech recognizer 108 for decoding the speech embedded in the audio signal 104. In some applications, and the speech recognizer 108 includes multiple $SRS_{A-B}$ that operate in parallel to decode the speech within the audio signal 104.

A speech recognition system (SRS) management module 110 monitors whether any of the SRS's have generated a recognition result and collects confidence values associated with those results. This monitoring is illustrated in the diagram 112 showing a parallel execution of the SRS's. The diagram 112 shows that $SRS_A$ generates a recognition result first with a confidence value of 0.3. Next, $SRS_E$ generates a recognition result with a confidence value 0.6. A little later, $SRS_B$ generates the recognition result with a confidence value 0.8. The SRS management module 110 can abort the remaining speech recognition tasks performed by $SRS_{C,D}$ after the recognition result is generated by $SRS_B$ because, in this implementation, the recognition result generated by $SRS_B$ has a confidence value which satisfies a predetermined confidence threshold.

In some implementations, a final result selection module 113 within the SRS management module 110 can select a final recognition result 114 to output to the voice-enabled telephone directory information server 106. For example, the SRS management module 110 can select the final recognition result based on a set of generated recognition results and associated confidence values 116 that are output by the $SRS_{A,B,E}$ that have completed the speech recognition tasks. In some implementations the final recognition result 114 is a symbolic representation of probable speech that was decoded from the audio signal 104. For example, the directory information server 106 may have prompted the user to say the name of a city and state. The spoken city and state name can be encoded in the audio signal 104 received from a user of the cell phone 102 and decoded by the speech recognizer 108. In some implementations, the final result is the speech that the decoder has determined is most probably represented by the audio signal 104.

The selection module 113 can transmit the final recognition result 114 to an interface 118 that, in turn, can transmit the final recognition result 114 to the voice-enabled telephone directory information server 106. In some implementations, the interface 118 uses a set of APIs that interface with software executed at the information server 126. For example, the information server 126 may execute software that has public methods for inputting textual representations of cities, states, and business names. In other implementations, the interface 118 can include networking protocols (e.g., TCP/IP) for transmitting the information over a network to the information server 126.

Although FIG. 1 shows the directory information server 106 and the speech recognizer on separate computing devices, this is not necessary. In some implementations, both systems can be implemented on a single computing device. Similarly, each of the systems can be implemented using several computing devices. For example, each of the SRS's may be implemented using one or more computers as shown in FIG. 2.

Figure 2:
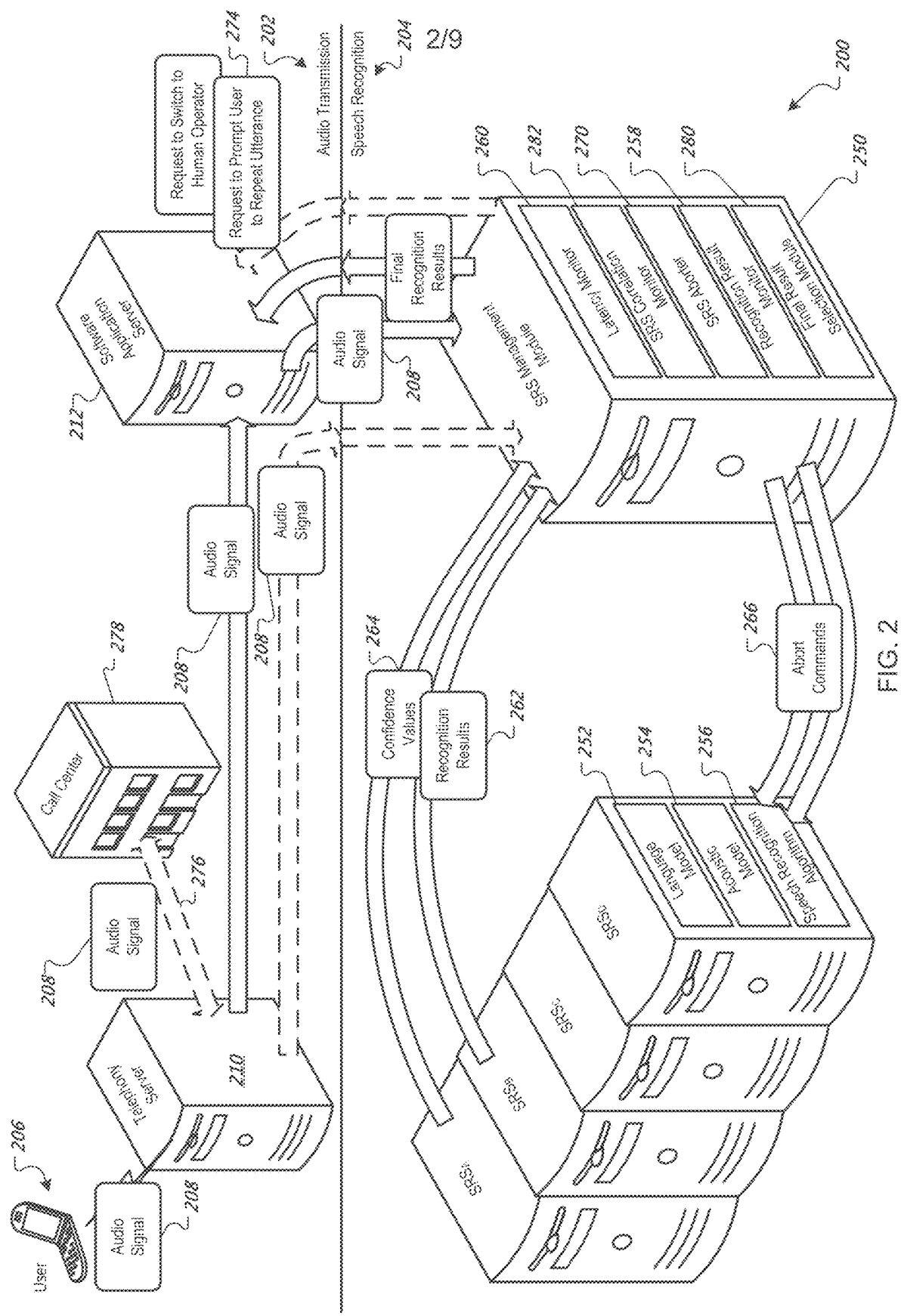
FIG. 2 is a more detailed diagram of an example system for decoding speech embedded in an audio transmission.

FIG. 2 is a diagram of an example system 200 for decoding speech embedded in an audio transmission. For purposes of illustration, the system 200 is divided into two segments: an audio transmission segment 202 and a speech recognizer segment 204. The audio transmission segment 202 shows example architecture for transmitting an audio signal from a user to an application server. The speech recognizer segment 204 shows example architecture for interpreting or decoding speech represented by the audio transmission. In this implementation, the decoding is performed on behalf of the application server and the decoded speech is transmitted back to the application server for use in processing the user's request.

In some implementations, the system 200, the audio transmission segment 202 includes a telephone device such as the cell phone 206, which transmits an audio signal 208 over a network (e.g., POTS, cellular, Internet, etc.) to telephony server 210. The telephony server can transmit the audio to another computing device, such as a software application server 212 or directly to a voice recognition system subsequently described.

The software application server 212 may include a software application with which the user is verbally interacting. For example, the software application server can be a calendar application. The user can call the calendar application and request that the calendar application create an event on May 16, 2012 from 1:30 PM to 2:00 PM. The software application server 212 can forward the received verbal input requesting the event creation to the speech recognizer segment 204 for decoding.

In some implementations, the speech recognizer segment 204 includes speech recognition systems, $SRS_{A-D}$ and a speech recognition system (SRS) management module, which can coordinate the SRS's for use in determining what utterance is most likely represented by the audio signal 208.

Each of the SRS's can differ in one or more ways. In some implementations, the SRS's may differ by their underlying acoustic models. For example, different acoustic models may target specific conditions, e.g., a user's gender, accent, age-range, or specific background and foreground noise conditions, or a specific transmission channel. The acoustic models may also vary by their architecture and size, e.g., smaller models with fewer parameters may produce faster recognition and larger models with more parameters may produce more accurate results. In other examples, the acoustic models may differ by their training procedures (e.g., different randomized training sets may be used to train the model or different training algorithms may be used).

In some implementations, the SRS's may differ by their language models. For example, the models may target different types of data, e.g., different domain specific language models, different granularity, or different geo-locations. In another example, the models may differ by their architectures, sizes, training procedure, etc.

In yet other implementations, the SRS's can differ by other components such as an end-pointer, front-end, dictionary, confidence estimation algorithm, search configuration, etc.

For illustrative purposes, a language model 252, acoustic model 254, and speech recognition algorithms 256 for $SRS_D$ are shown in FIG. 2.

In some implementations, when the SRS management module 250 receives the audio signal 208, it initiates a process by which the incoming utterance is recognized using two or more of the SRS's in parallel. For example, four speech recognition tasks are executed in parallel by the four SRS's ($SRS_{A-D}$) in an attempt to recognize the same utterance represented by the audio signal 208.

In some implementations, each SRS may have a specific latency. The latency may depend on the SRS architecture (e.g., acoustic model, language model, or other components), but it also may vary based on a specific instantiation of a speech recognition task. For example, if a SRS has information indicating that the utterance will fall within a certain group of words (e.g. yes, no, nope, yeah, affirmative, negatory, no way, yipper, etc.), the latency for a particular model may be much shorter than when the SRS does not have information indicating a constrained context in which the utterance was uttered (e.g., the utterance was not in the context of a yes or no question).

In some implementations, each SRS, upon completion of its speech recognition task, outputs a recognition result (e.g. what the SRS determines the incoming utterance said), and a measure of how confident the SRS is in the correctness of its result.

In some implementations, the SRS management module 250 has a recognition result monitor 258 that keeps track of recognition results 262 that are generated by the SRS's. The result monitor 258 can also monitor the confidence values 264, or scores, associated with the recognition results 262.

In some implementations, the result monitor 258 can calculate combined confidence scores for each recognition result. For example, $SRS_A$ and $SRS_B$ may generate a recognition result "May 16" for an incoming utterance $SRS_A$ may associate its result with a confidence value of 0.8 and $SRS_B$ may associate its result with a confidence value of 0.7 The result monitor 258 can calculate that the current running average for the result "May 16" is 0.75 (i.e., (0.8+0.7)/2). The combined confidence value can be updated every time the recognition result (and corresponding confidence value) is generated by a SRS.

The SRS management module 250 may also include a latency monitor 260 that tracks the latency (e.g., actual or estimated time to completion of the speech recognition task) for each of the SRS's. For example, the latency monitor 260 can track how long a particular speech recognition task has taken a SRS to produce a recognition result.

The latency monitor 260 can also monitor whether or not a SRS has completed a speech recognition task (e.g. by monitoring whether the SRS has output a recognition result). Additionally, the latency monitor 260 can estimate a predicted latency for a SRS to complete a speech recognition task. For example, the latency monitor 260 can access empirical information gathered for the SRS that indicates how long the SRS has taken to complete a similar speech recognition tasks (e.g., how long it has previously taken a SRS to decode an utterance spoken in a similar context such as in answer to a particular prompted question).

The latency monitor 260 may also access information about characteristics of underlying model(s) to determine an estimated time for a SRS to complete a speech recognition task (e.g., the latency monitor 260 can determine whether the SRS may take longer to complete a speech recognition to due to a larger dictionary of words that must be searched to identify a recognition result).

The SRS management module can include a SRS aborter 270 that communicates with the latency monitor 260 and/or the recognition result monitor 258 to determine whether to transmit abort commands 266 for SRS's that have not yet completed decoding the received audio signal 208. For example, the SRS aborter 270 may determine whether the tracked confidence values and/or latencies satisfy an operating point or curve. If so, all remaining speech recognition to can be aborted.

In a simple example, the SRS management module 250 may determine that a confidence threshold of 0.75 for a recognition results should be reached before aborting any unfinished speech recognition tasks. In some implementations, the confidence threshold may vary for different speech recognition tasks. For example, if context information associated with a particular speech recognition task indicates that the recognition result is limited to a relatively small number of utterances (e.g., the recognition task is in the context of an answer to a yes or no question presented to the user), the SRS supporter 270 can determine that the confidence value should be relatively high (e.g., 0.8, 0.9, 0.95).

If the context indicates that the recognition result may include any one of many possible utterances (e.g., a user is asked an open-ended question such as "What would you like to do today?"), the SRS aborter 270 can determine that the confidence threshold for the recognition result may be relatively low (e.g., 0.49, 0.55, 0.61) and still acceptable to the SRS management module 250.

In some implementations, if threshold confidence point (e.g. 0.75) is met by one of the recognition results, the aborter 270 can transmit the abort command 266 to any unfinished SRS's. For example, if the combined confidence value of the $SRS_{A,B}$ is equal to or greater than 0.75, the aborter 270 can transmit the abort command 266 to the SRS's that have not generated a recognition result yet.

In another example, the aborter 270 may transmit the abort commands 266 if one of the recognition results has a confidence value that is equal or greater than 0.75. In this case, the confidence value may not be a combined confidence value but instead may be a single confidence value associated with a recognition result in generated by a single SRS.

In other implementations, the SRS aborter 270 can transmit abort commands based on actual or estimated latencies for the SRS. For example, if $SRS_A$ and $SRS_B$ have generated recognition results and the recognition results are associated with very low confidence values, the SRS aborter 270 may abort the remaining unfinished speech recognition tasks. In this case, the remaining speech recognition tasks may be cancelled under an assumption that the SRS's that have not completed the recognition task will not produce a recognition result that has a high confidence value because other SRS's have not produced such a recognition result.

Instead of waiting for the remaining SRS's to finish, in some implementations, the SRS aborter 270 can transmit the abort commands 266 and initiate a process where the user is requested to repeat an utterance 274. The SRS's can then attempt to decode the new utterance.

In other implementations, if the recognition results are unsatisfactory based on confidence values or other parameters, the SRS management module 250 can initiate a process in which a request is made to switch to a human operator. For example, the human operator can intercept the audio signal in response to the user as indicated by an arrow 276, which illustrates routing the audio signal to a call center 278. The human operator can address the request or information conveyed by the user.

In some implementations, the SRS aborter 270 can first query the latency monitor 260 to determine whether to transmit the abort commands 266 to the unfinished SRS's. For example, if the SRS aborter 270 queries the latency monitor 260 and determines that one of the unfinished SRS's will likely complete in a relatively short amount of time, the SRS aborter 270 can hold off to obtain the results from the nearly completed SRS. After the result(s) are generated, the SRS aborter 270 can transmit the abort commands 266 to stop the remaining unfinished SRS's from completing the speech recognition.

In some implementations, the additional recognition result and associated information may be valuable enough to delay transmitting the abort command until a nearly finished SRS has completed. For example, if characteristics associated with the nearly finished SRS indicate that its recognition results are often more accurate than the results of the previously completed SRS's, the aborter 270 may wait until the nearly finished SRS has generated a recognition result before aborting the remaining unfinished speech recognition tasks.

In some implementations, the confidence threshold is determined using a function with one or more variables. For example, a confidence function can have variables including the confidence values and latencies. If the generated confidence values and observed latencies satisfy the confidence function, the aborter 270 can cancel any unfinished speech recognition tasks. For example, within short latency periods, the confidence function may dictate that the confidence values should be very high for the confidence function to be satisfied. This may be based partially on an assumption that if the aborter 270 quickly issues an abort command, the probability that the generated result is correct should be very high because other potential recognition results will not be generated. As the latency increases, the required confidence values may drop under an assumption that a speech recognition task that takes longer to process may be more difficult, and thus, the confidence in the result will likely be lower.

The SRS management module 250 can also include a final results selection module 280 that, in some implementations, selects a final recognition result from the generated recognition results. For example, the selection module 280 can select a recognition result with the highest combine confidence value or the recognition result with the highest single confidence value.

In some implementations, the selection of the final recognition result can be influenced based on which SRS generated the recognition result. For example, the selection module 280 may weight, or favor, the selection of a recognition result if it is generated by SRS's that have relatively different components (e.g. language models, acoustic models, speech recognition algorithms, etc.) and/or that typically produce different recognition results.

In some implementations, a SRS correlation monitor 282 can track a correlation between the output recognition results for SRS's. If the output recognition results indicate that two SRS's are not highly correlated, yet in a particular recognition task they generate the same recognition result—that result can be more heavily weighted, or favored, in the selection of the final recognition result. Alternatively, if the SRS's that generate a recognition results are highly correlated, the recognition result may be discounted, or not weighted so that the result is not necessarily favored in the selection of the final recognition result.

The correlation monitor 282 can dynamically update correlation values that specify a correlation between two more SRS's based on recognition results generated by the SRS's. For example, two SRS's that are associated with a low correlation value may begin to produce similar recognition results. The correlation monitor 282 can update the correlation value (e.g., increase it) to reflect the increase overlap in recognition results between the SRS's.

After the final results selection module 280 identifies a final result, the SRS management model can transmit the result back to the software application server that requested that the audio signal be decoded. The software application server can use the decoded audio signal to process the user's request.

Figure 3:
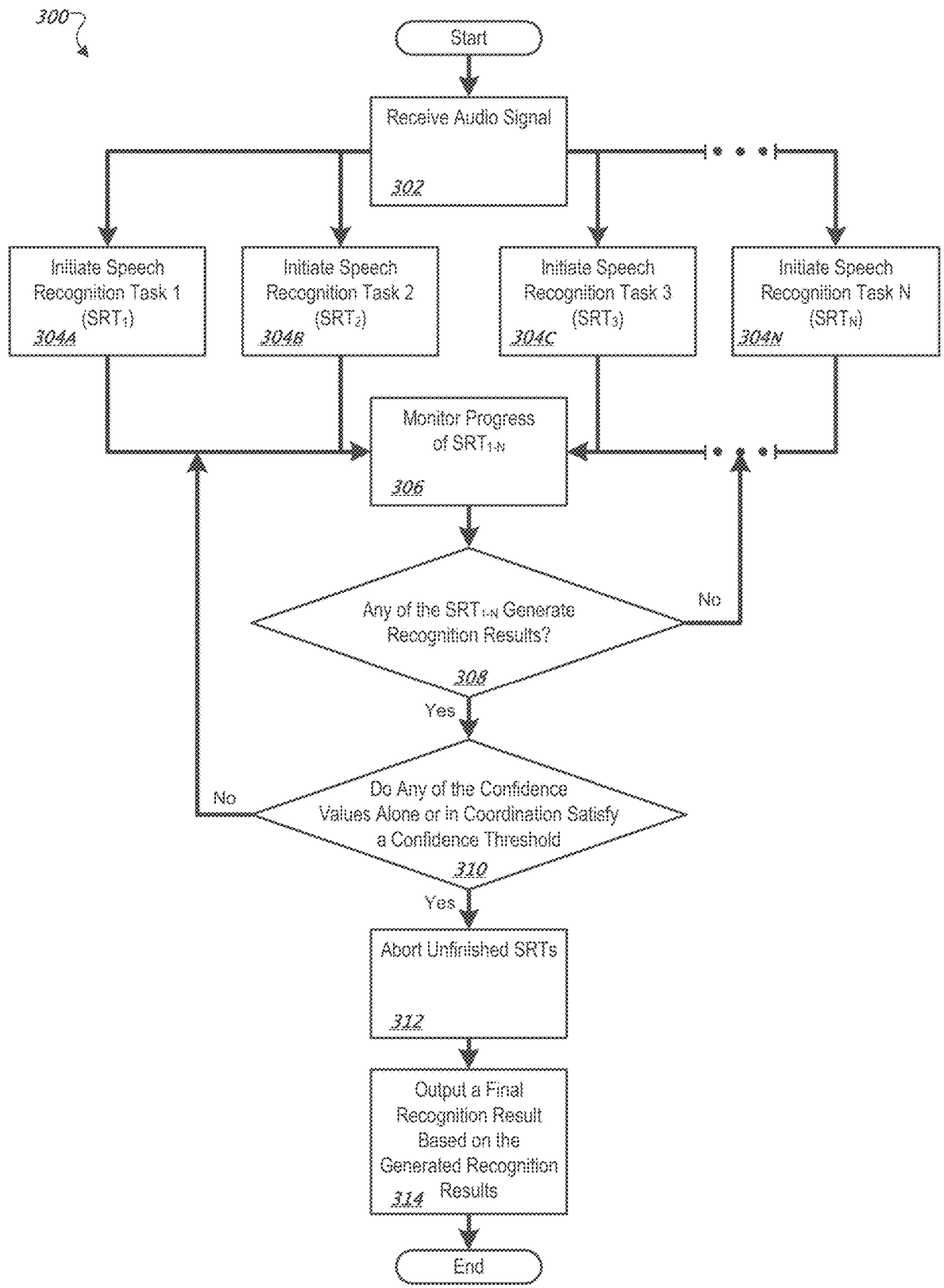
FIG. 3 is a flow diagram of an example method for recognizing speech using parallel decoding.

FIG. 3 is a flow diagram of an example method 300 for recognizing speech using parallel decoding. The method 300 may be performed, for example, by a system such as the systems 100 and 200 and, for clarity of presentation, the description that follows uses the systems 100 and 200 as the basis of an example for describing the method. However, another system, or combination of systems, may be used to perform the method 300.

In step 302, an audio signal is received. For example, the speech recognizer 108 may receive the audio signal 104. In some implementations, the audio signal 104 has already been sampled and segmented into digital frames for processing before transmission to the speech recognizer 108. In other implementations, the speech recognizer 108 performs these functions as well.

In some implementations, the audio signal may have been pre-processed to identify which portions of the signal contain speech and which portions are determined to be noise. The received audio signal 104 may only include the portions determined to have speech, which may then be decoded by the speech recognizer 108 in the following steps.

In steps 304A-N, speech recognitions tasks (SRT's) are initiated. In some implementations, the SRT's are initiated substantially simultaneously and begin to decode speech represented by the audio signal 104. SRS's such as $SRS_{A-D}$ of FIG. 2, may have different latencies in processing the audio signal so that the SRT's may required different amounts of time to complete.

In step 306, the progress of the SRT's is monitored. For example, the latency monitor 260 can track the latency (both actual and estimated) associated with each SRS.

In step 308, it is determined whether any of the SRT-N have generated recognition results. For example, the SRS's may output the recognition results (or an indication that the result exists) to the recognition result monitor 258 after they are generated. If none of the SRS's has generated recognition results, the method 300 can return to step 306 and continue monitoring the progress of the SRT's. If the SRS's have generated one or more recognition results, the method can continue to step 310.

In step 310, a determination is made whether any confidence values associated with the generated recognition result(s) satisfy a confidence threshold. For example, the SRS aborter 270 can compare confidence values (either single or combined confidence value) for the recognition results to a confidence point or a confidence function as previously described. If the current confidence values do not meet the confidence threshold, the method 300 can return to step 306 where the progress of the SRT's are monitored. If the confidence threshold is met, the method 300 can proceed to step 312.

In step 312, unfinished SRT's are aborted. For example, if there are ten SRT's executing in parallel and four have completed, the remaining six SRT's can be canceled or aborted. In some implementations, the SRS aborter 270 can transmit abort commands 266 to the appropriate SRS's so that they cease speech recognition tasks.

In some implementations, one or more of the speech recognition tasks are not aborted, but merely "paused," (e.g., the state of the processing task may be saved and restarted at a later time). For example, if a recognition result turns out to be incorrect (e.g., a user replies in the negative when the software application server prompts a user to confirm the speech has been decoded correctly), the "paused" speech recognition tasks can be restarted.

In some implementations, the SRT's can be selectively paused based on, for example, the accuracy of the SRS executing the SRT. For example, if a recognition result is associated with a confidence value that just barely meets the confidence threshold, the aborter 270 may selectively pause the SRT's of the more accurate SRS's while aborting the rest of the SRT's. If the recognition result turns out to be incorrect, the paused SRT of the more accurate SRS can be restarted.

In some implementations, the SRT's that previously completed and the ones that were previously aborted can be started simultaneously with the "unpaused" SRT. This may give the more accurate SRT more time to complete than if the SRT was completely restarted. In yet other implementations, information inferred or determined based on the user's confirmation of the incorrect recognition can be integrated into the unpaused SRT's as will as the restarted tasks. For example, the erroneous utterance can be removed from consideration in the new round of speech decoding. Additionally, some sounds, words, etc. used to determine the erroneous result may be discounted or excluded from consideration in the second round of recognition processing.

In step 314, a final recognition result is selected based on the generated results. For example, the final result selection module 280 can identify a recognition result that is associated with the highest averaged confidence score. In some implementations, the selection can also be weighted based on the accuracy of the SRS producing the result, where results from typically accurate SRS's are favored over less accurate SRS's. In yet other implementations, the selection can also be based on the correlation between machines that generate the result or a frequency of occurrence associated with the result. The selected result can be output to the application that requested decoding of the audio signal. Next, the method can end.

FIGS. 4A-C show diagrams illustrating executions of example speech recognition tasks. FIG. 4A shows the execution of four SRT's by four SRS's. In the illustrated implementation, the SRT's are initiated in parallel and $SRS_A$ generates a recognition result first. The $SRS_A$ determines a confidence value of 0.7 for its recognition result. In some implementations, the SRS management module 110 can compare the confidence value against a confidence threshold. If the confidence value does not meet the threshold, the remaining tasks are permitted to execute. For instance, if the confidence threshold was fixed constant of 0.9, the SRS management module would permit the remaining SRS's to continue because the initial recognition result of 0.7 did not meet the threshold.

Next, $SRS_B$ generates a recognition result and an associated value of 0.85. This confidence value does not meet the 0.9 confidence threshold either, so the remaining tasks are allowed to continue.

Additionally, the SRS management system may also track the latency associated with each of the SRS's and may compare these latencies to a permitted latency threshold. As shown in FIG. 4A, in some implementations, the SRS management module 110 can transmit an abort command to SRS's (e.g., $SRS_C$ and $SRS_D$) if they do not produce a recognition result before the latency threshold.

In some implementations, if the SRT's are aborted before a recognition result is generated that meets the confidence threshold, the SRS management module 110 may select a result that has the highest confidence value even if it did not meet the confidence threshold. In some implementations, the next highest confidence value may have to be within a determined range of the confidence threshold (e.g., 10%) to be selected. In yet other implementations, if a recognition result is not selected, the SRS management module 110 may send a request that the verbal input be repeated.

FIG. 4B is a diagram illustrating aborting unfinished SRT's once a SRS generates a recognition result having a confidence value that meets a confidence threshold. In this example, the confidence threshold is 0.9. The $SRS_A$ generates a recognition result first, but it assigns a confidence value of 0.7 to the result, which is lower than the confidence threshold. Consequently, the SRS management module 110 permits the $SRS_{B-D}$ to continue executing.

$SRS_B$ generates a recognition result next and assigns it a confidence value of 0.9. The SRS management module 110 compares this confidence value to the confidence threshold and determines that the threshold is met. The SRS management module may then send out an abort command to $SRS_C$ and $SRS_D$, which stop their respective SRT's without producing a recognition result.

FIG. 4C is a diagram illustrating aborting unfinished SRT's based on low confidence values of recognition results that have been generated in this example, the confidence threshold may be set at a fixed point of 0.9. The $SRS_A$ and the $SRS_B$ generate recognition results, however, both results are associated with relatively low confidence values 0.3 and 0.25, respectively. Given that the confidence values are both relatively low, the SRS management module 110 may transmit an abort command to $SRS_C$ and $SRS_D$ under an assumption that these SRS's are unlikely to produce a recognition result having a confidence value that meet a confidence threshold because the previous SRS's produced recognition results having confidence values significantly below the confidence threshold.

In some implementations as illustrated in the FIG. 4C, the SRS management module 110 can wait a determined amount of time before transmitting the abort command based on the low confidence values of previously generated recognition results. In some implementations, the SRS management module 110 initiates the time period based upon when the last recognition result was generated. The determined time period may allow for another SRS to complete its SRT; however, if no result is generated during the time period allowed, the command to abort any unfinished of SRT can be transmitted.

In some implementations, the determination of the time period to wait may be based on an estimated latency of one or more of the SRS's that have not generated a recognition result. For example, the SRS management module 110 may determine that the $SRS_C$ has the shortest estimated latency of the remaining SRS's. For instance, the $SRS_C$ may have a typical latency of 0.5 seconds. If the $SRS_B$ generates a recognition result after 0.4 seconds, the speech recognition management module 100 may delay 0.1 seconds to determine if the $SRS_C$ generates a recognition result before transmitting an abort command.

In other implementations, the abort command can be transmitted immediately. For example, the SRS management module 110 can transmit an abort command after a determined number of SRS's generates a recognition result also associated with a low confidence value. In the case shown in FIG. 4C, the abort command is transmitted as soon as half of the SRS's return a recognition result associated with a low confidence value.

In some implementations, if the confidence value is low, the system continues to receive more recognition results until the system confirms that the composite (e.g., total/accumulated) confidence value is above some threshold. With some recognition tasks, the confirmation never occurs, and the system can end the recognition process by rejecting the utterance. Therefore, in some implementations, there are three types of confidence: first, an original confidence from each recognition process; second, an accumulated total confidence determined from the original confidences from each recognition process, and third, an expectation that the total confidence may change (e.g., increase) as the system waits for more recognition events.

In some cases, the system receives a sufficient number of consistently low confidence results across de-correlated recognizers to encourage aborting all recognition tasks and rejection the utterance. If the rejection occurs, the system can prompt the user to repeat the utterance. The rejection case may occur, for example, when the individual original confidence values are consistently low, the accumulated total confidence is low, and the expectation that the total confidence may change with more recognition is also low.

In some implementations, training for the estimated expected confidence change given a particular set of confidence values is performed ahead of time by counting distributions of final recognition confidence given training examples of partial recognition confidences. (e.g., after seeing 20 confidence values below 0.1 from the first 20 fast recognizers, the system never experiences examples where the combined confidence value with more than 20 recognizers increased the total confidence value above 0.5. Thus, the system is trained to reject the utterance when this situation occurs).

Figure 5A:
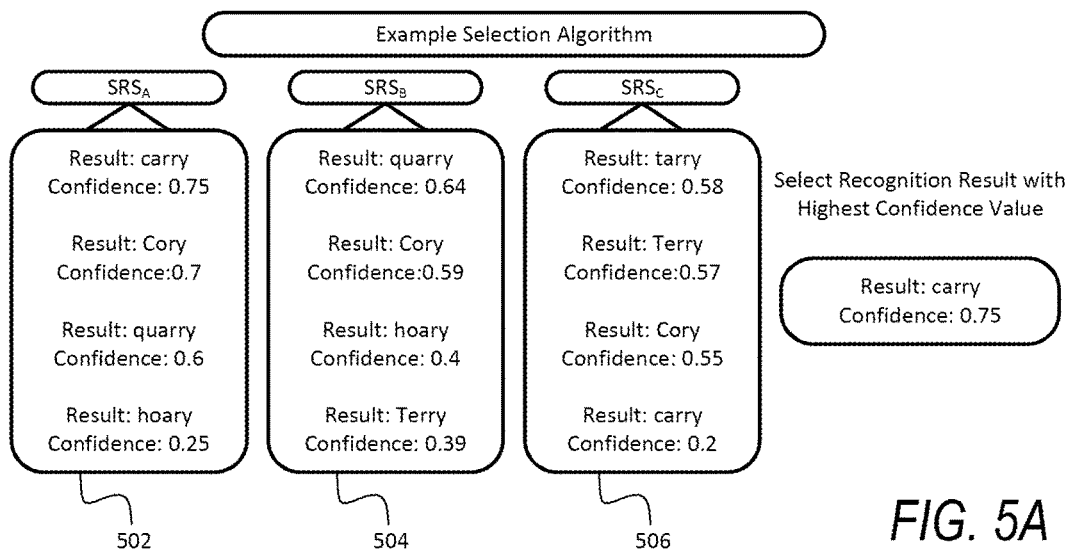
FIGS. 5A-C are diagrams of example recognition results and confidence values generated by SRS's and different methods of selecting a final recognition result.
Figure 5B:
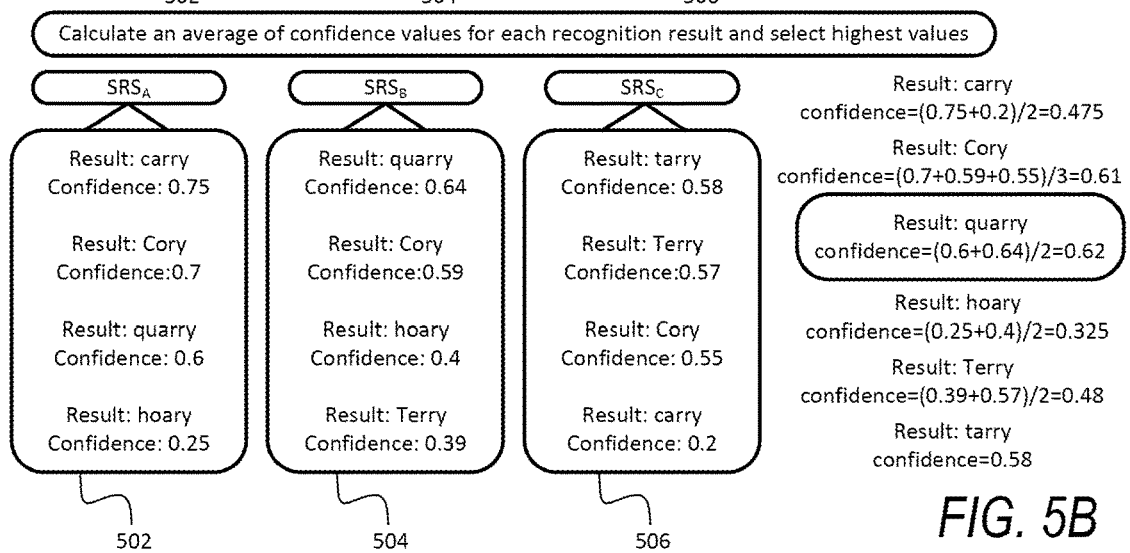
Figure 5C:
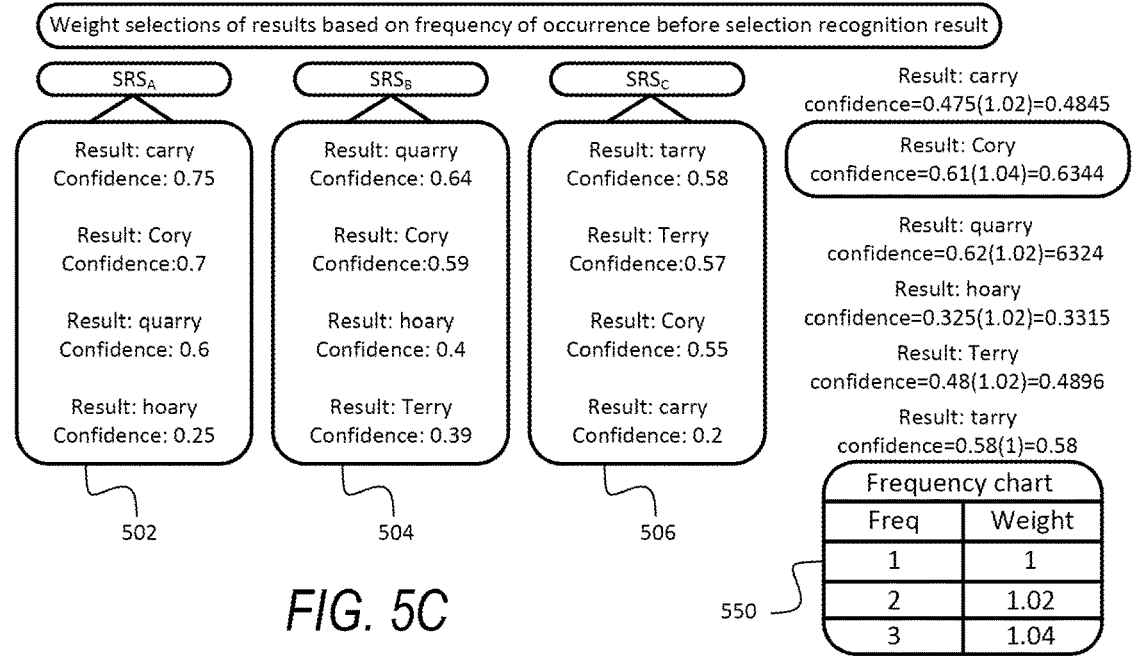

FIGS. 5A-C are diagrams of example recognition results and confidence values generated by SRS's and different method of selecting a final recognition result. Specifically, FIGS. 5A-C show $SRS_A$ output 502 from $SRS_A$, $SRS_B$ output 504 from $SRS_B$, and $SRS_C$ output 506 from $SRS_C$. In this example, the output is generated in response to each SRS attempting to decode an audio signal that represents the word "carry" Because each of the SRS's may be different, the recognition results produced by the SRS's may be different as illustrated by FIGS. 5A-C.

In some implementations, the SRS output includes a top N recognition results (where N can represent any positive integer or 0) that are selected based on which recognition results are associated with the greatest confidence values. For example, the $SRS_A$ output 502 includes the top four recognition results for $SRS_A$ and associated confidence values: Result=carry, Confidence=0.75; Result=Cory, Confidence=0.7; Result=quarry, Confidence=0.6; and Result=hoary, Confidence=0.25.

The $SRS_B$ output 504 includes Result=quarry, Confidence=0.64; Result=Cory, Confidence=0.59; Result=hoary, Confidence=0.4; and Result=Terry, Confidence=0.39.

The $SRS_C$ output 506 includes Result=tarry, Confidence=0.58; Result=Terry, Confidence=0.57, Result=Cory, Confidence=0.55; and Result=carry, Confidence=0.2.

FIG. 5A shows an example selection algorithm that selects a recognition result associated with the highest confidence value. For example, the final result selection module 113 may compare all of the recognition results and select the one associated with the greatest confidence value. In this example, the result "carry" is selected as a final recognition result because it is associated with the highest confidence value—0.75—out of all the confidence values. The selection module may then output the recognition result "carry" for further processing by the application that requested the speech decoding.

FIG. 5B shows an example selection algorithm that selects a recognition result based on which result has a highest combined confidence value. For example, more than one SRS may generate the same recognition result, but may assign a different confidence value to the result. In some implementations, multiple confidence scores for the same result can be averaged (or otherwise combined) to create a combined confidence score. For example, the recognition result "carry" is generated by both $SRS_A$ and $SRS_C$, however, $SRS_A$ assigns the result a 0.75 confidence value and $SRS_C$ assigns the result a 0.2 confidence value. The average of these confidence values is 0.475.

Similarly, the average combined confidence score for the recognition result "Cory" is 0.61 and the combined confidence score for "quarry" is 0.62. In this example, the selection module 113 may select "quarry" as the final recognition result because its combined confidence value is greater than the combined confidence values of the other results. Notice that this selection algorithm produces a different final result than the algorithm described in FIG. 5B despite the fact that the selection was made from the same pool of recognition results.

FIG. 5C shows an example selection algorithm that takes into account weighting factors in a selection of the recognition result. In some implementations, the weights may be based on a frequency of occurrence of the recognition result. For example, a table 550 lists three weights that may be multiplied times the combined confidence scores previously discussed to create new weighted confidence scores.

In this example, a weight of "1" is multiplied times the combined confidence score if the recognition result is generated by a single SRS (e.g., if the result occurs with a frequency of "one"). Consequently, if the recognition result only occurs once, it will not receive any benefit from the weighting. If a recognition result occurs twice, it may be weighted using a factor of 1.02, which slightly favors the recognition result over another recognition result that only occurs once. If a recognition result occurs three times, it may be weighted by a factor 1.04.

In the example of FIG. 5C, the combined confidence value for the recognition result "Cory" would be weighted against a factor of 1.04, which results in a weighted value of 0.6344. The combined confidence value for the recognition result "quarry" would be weighted against a factor of 1.02, which results in a weighted value of 0.6324. In this case, the selection module 113 may select the result "Cory" over the result "quarry" because the weighted combined confidence score of the former is the higher than that of the latter even though the unweighted combined confidence score of "Cory" is less than that of the result "quarry."

Values used to select the final recognition result may be weighted based on several criteria including, but not limited to, the distribution of confidence scores generated by an SRS, characteristics of a SRS that generated the recognition result (e.g., overall accuracy, accuracy in a particular context, accuracy over a defined time period, etc.), and the similarity between the SRS's that produce the same recognition result.

In other implementations, the final recognition result may be weighted using a correlation of recognition confidence values with recognition errors for a recognizer and for the final composite recognizer. For example, during training the system can count a number of times that a particular recognizer comes back with a confidence value of 0.3, and also count how often those "0.3 confidence recognition results" are errors for that recognizer and how often the final combined recognition is also a recognition error. The system may use the same normalization counting when combining similar recognition results. The combined confidence can be estimated from a number of times that the recognizers had the same result (with given confidence values) and that the common result was correct.

Figure 6:
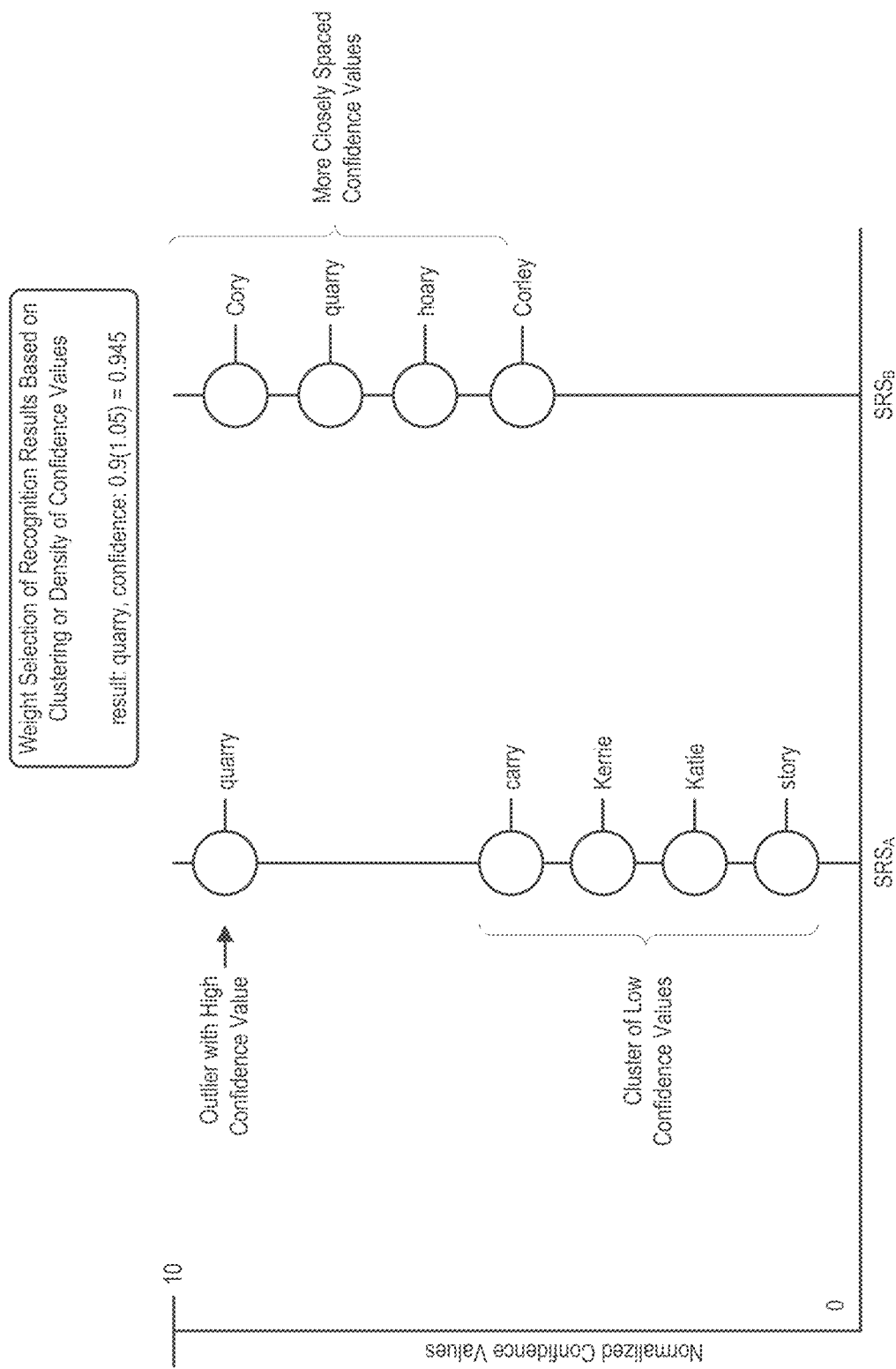
FIG. 6 is an example graph of a distribution of confidence values used to weight values used in a selection of a final recognition result.

FIG. 6 is an example graph 600 of a distribution of confidence values used to weight values used in a selection of a final recognition result. The y-axis of the graph indicates where along a normalized scale (from 0.0 to 1.0) a particular confidence value falls. The x-axis of the graph labels which particular SRS produces which recognition result. In the example, the $SRS_A$ generates five recognition results, four of which are clustered relatively close together toward the mid-to-lower range of possible confidence values. A single recognition result, quarry, is located substantially separate from the other recognition results and has a relatively higher confidence value. This may indicate that $SRS_A$ has more confidence that the result "quarry" is significantly better than the other results, which are more fungible for each other.

In some implementations, the outlier, or separate, higher confidence value can be weighted to favor selection the associated recognition result. For example, the selection module 113 can weight the confidence value 0.9 for the result "quarry" with a constant of 1.05. The resulting confidence value for "quarry" then increases to 0.945.

Alternatively, the confidence values that are more evenly spaced may not receive additional weighting (or may receive less weighting). For example, the confidence values for the recognition results generated by the $SRS_B$ are more evenly spaced with no significant outliers. In this case, the selection module 113 may not add a weight to a confidence value for the top ranked recognition result "quarry," because it is less likely that the top ranked recognition result is correct (e.g., "quarry" does not stand out as far and away the top result among a cluster of results with lower confidence values).

FIGS. 7A-E are Venn diagrams shown example recognition result sets output by SRS's and correlations between the sets, which may be used to weight the recognition results. FIG. 7A is a Venn diagram 700 that includes three recognition result sets—recognition results$_A$ generated by $SRS_A$, recognition results$_B$ generated by $SRS_B$, and recognition results$_C$ generated by $SRS_C$.

As illustrated by the Venn diagram 700, results$_A$, results$_B$, and results$_C$ partially overlap. In the example, results$_A$ and results$_A$ have more results which overlap compared to the overlap between results$_A$ and results$_C$ or results$_B$ and results$_C$. This may indicate that the $SRS_A$ and $SRS_B$ often produce the same recognition result (or results), whereas $SRS_C$'s results do not correspond to the results of $SRS_A$ or $SRS_B$ as often.

In some implementations, the intersection of results is based on which SRS's produce the same recognition results in response to a particular speech recognition task. For example, if two SRS's generate a top ranked recognition result for a particular task, this result may be added to the intersection set.

In another example, if a first SRS generates a recognition result "Cory" as it's top result and a second SRS generates the recognition result "Cory" as it's fourth ranked result (out of five generated results), the result "Cory" is added to the intersection set. In some implementations, results that are not both associated with a top ranking may be added to the intersection result, but may also be associated with a discount factor that indicates they differ in ranking. For example, a difference between the two rankings can be used to discount a weighting factor associated with the intersection (e.g., each difference in rankings may be associated with a discount factor). For instance, if the rankings are 1 and 4, the absolute difference is 3, which may be associated with a discount factor of 0.3 that is multiplied times a weight associated with the intersection. For example, if the weight is 1.03 and the discount factor is 0.3, then the total weight can be multiplied against the "boost" factor of the weight 1.03, namely, against 0.03. This results in a new, lower boost factor of 0.01 so that the new total weight value is 1.01.

In some implementations, an overlap in recognition results between SRS's may be used to weight the recognition results so that they are favored or disfavored in a selection of a final recognition result. For example, if a recognition result is generated by two SRS's that often agree, it may be weighted less (or disfavored) relative to a recognition result that is generated by two SRS's that do not often agree. FIGS. 7B-E illustrates this in more detail.

FIG. 7B shows a Venn diagram 710 that only includes the results$_A$ and results$_B$ from the Venn diagram 700 of FIG. 7A. As previously described, the SRS$_A$ and SRS$_B$ may be classified as somewhat similar based on the similarity in their recognition results. In some implementations, a weighting factor can be assigned to a recognition result that falls within an overlap between two (or more) SRS's. For example, a weighting factor of 0.01 may be associated with recognition results that fall within this set.

In some implementations, this weighting factor is smaller when the overlap is bigger, and the weighting factor is greater when the overlap is smaller. This may reflect an assumption that results that are generated by SRS's that do not often agree should be favored because these overlapping results are more likely to be correct. For example, SRS's that produce differing results may have different underlying architectures and be susceptible to different types of recognition errors.

FIG. 7C shows a Venn diagram 720 that only includes the results$_A$ and results$_C$ from the Venn diagram 700 of FIG. 7A. In this example, the overlap between the results is smaller than the overlap shown in FIG. 7B.

Thus, in this implementation, the weighting factor of 0.06 is greater for results that fall within the overlap relative to results within the intersection shown in FIG. 7B.

Similarly, FIG. 7D shows a Venn diagram 730 that includes the results$_B$ and results$_C$. The intersection of these results is of a size between the intersections of FIGS. 7B and 7C. Thus, in this implementation, the weighting factor is also of a size (e.g., 0.03) between the weighting factors associated with the intersections of the FIGS. 7B and 7C.

FIG. 7E shows the Venn diagram 700 also shown in FIG. 7A, however, an intersection between the results of all SRS$_{A-C}$ is highlighted. The intersection reflects a set of recognition results that have been generated by each of the SRS's. Given that agreement between the three SRS's is relatively rare (in this example), a recognition result that falls within this set may be associated with a weight that is higher than the other weights, namely, 0.1.

Figure 8B:
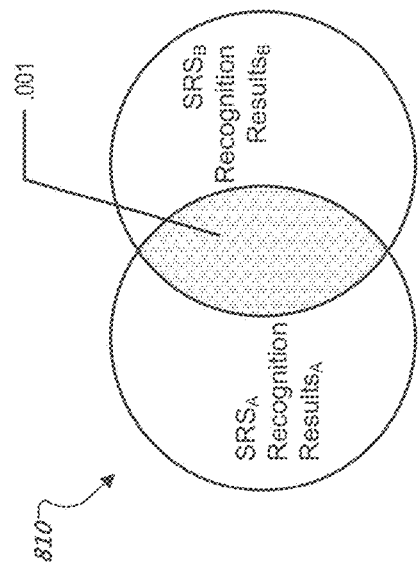
FIGS. 8A and 8B are Venn diagrams that illustrate how an intersection between SRS's may adapt or change during runtime operation of a speech decoding system.
Figure 8A:
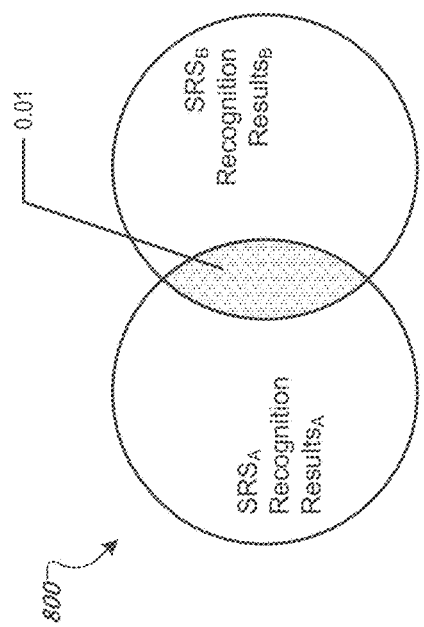

FIGS. 8A and 8B show Venn diagrams 800 and 810 that illustrate how the intersection between SRS's may adapt or change during runtime operation of the system. In some implementations, as an intersection of recognition results changes, weights associated with the intersection may change as well.

FIG. 8A shows an example first intersection in recognition results generated by SRS$_A$ and SRS$_B$. The first intersection is associated with a weight of 0.01. In some implementations, the speech recognizer 108 performs additional speech decoding and generates additional recognition results. The SRS correlation monitor 282 can monitor the results and identify intersections of the results between the various SRS's.

The correlation monitor 282 can dynamically update the intersection calculations as more results are generated. This is illustrated by FIG. 8B, which shows the same SRS$_A$ and SRS$_B$ in FIG. 8A except that the intersection has changed. In this example, the intersection has grown because the number of times that the SRS's have agreed for a particular speech recognition task has increased relative to the number of tasks that the SRS's have performed.

In response to the increased intersection set, the weight can also be decreased. For example, the intersection result set of the diagram 810 can be associated with a lower weight of 0.001. In some implementations, the change in the weight value can be linearly associated with the change in the size of the intersection result set. For example, the system may weight or favor a result from a recognizer less when the recognizer is similar to another recognizer. In FIGS. 8A and 8B, a similarity in recognition results for two recognizers is expressed as an intersection between the two recognizers, where the greater the intersection, the less weight the system may attach to the recognition results when both recognizers generate the same result. In contrast, when two recognizers are very different (e.g., they generally produced different recognition results due to different speech recognition algorithms, etc.) the intersection of results may be smaller. When these two different recognizers then agree on an utterance, the system can weight their results so that they are more heavily considered by the system because the agreement may indicate that the result is more likely to be correct.

Figure 9:
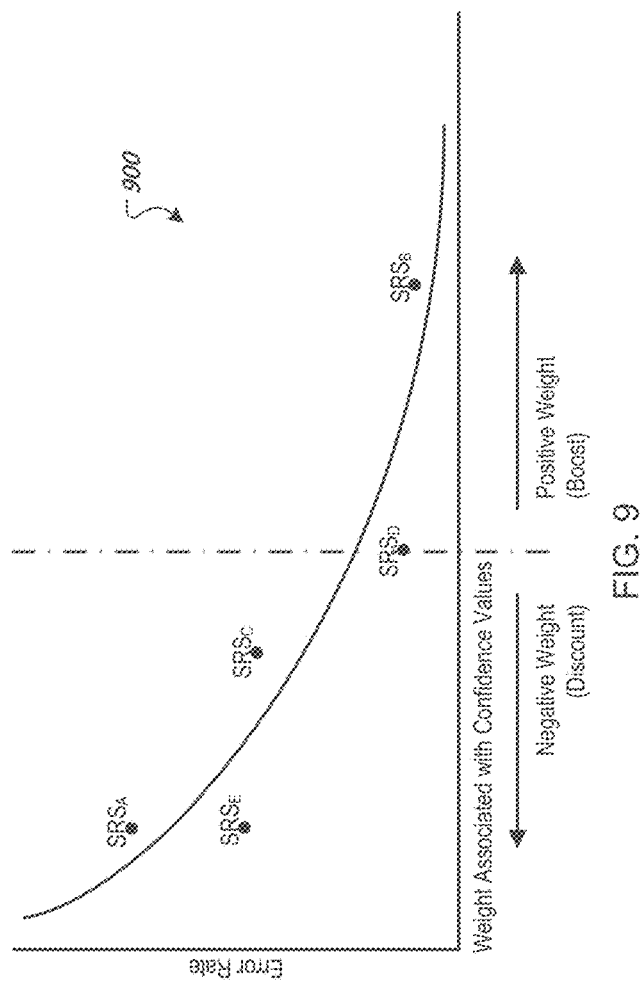
FIG. 9 is a graph illustrating an example correlation between an SRS's error rate and weights to associated with recognition results.

FIG. 9 is a graph 900 illustrating an example correlation between an SRS's error rate and weights to associate with recognition results. In some implementations, recognition results generated by SRS's with low error rates may be weighted more heavily in a selection of the final recognition results. For example, if a SRS has a high error rate, its recognition result may be discounted (or not weighted as heavily) compared to a recognition result generated by a highly accurate SRS.

The graph 900 illustrates an example function, or algorithm, for assigning weights to particular SRS. The y-axis of the graph 900 indicates the error rates associated with SRS's, and the x-axis indicates the weight associated with the SRS's. In this example, a discounting weight (e.g., 0.9, 0.95, 0.8) is used to weight SRS's (e.g., SRS$_A$, SRS$_B$, SRS$_C$) that have an error rate above a determined threshold. A boost weight (e.g., 1.01, 1.04, 1.1) is used to weight SRS's (e.g., SRS$_E$) that have an error rate below the threshold. In this example, a neutral weight (e.g., 1) is used to weight SRS's that fall on the error threshold (e.g., SRS$_D$).

In some implementations, the error rate associated with each SRS may be updated based on confirmation that the recognition result is incorrect (e.g., the result is selected as the final recognition result and is rejected by a user, a first result is selected as the final recognition result and is determined to be correct based on a user's acceptance so the unselected results are recorded as erroneous results, etc.). The selection module 113 can dynamically vary the weight based on the updated error rate associated with each SRS.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well, for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, a combined, or joint, confidence score of multiple SRS's may include features such as consistency of hypotheses, or guesses as to an utterance's identity. For example, three SRS's outputting a first result with a confidence of 0.8 may be more reliable than one SRS outputting a second result with a confidence of 0.9.

In some implementations, a predetermined set of SRS's can be selected for use based on latency or other factors. For example, if audio is received in response to prompting a user for an answer to a yes or no question, the fastest two SRS's can be selected to process the answer instead of permitting all available SRS's to process the answer.

Additionally, in some implementations, overall confidence in a final recognition result may drop when individual recognition results generated by SRS's do not agree. One example algorithm for selecting a "best" current result when recognition results do not overlap at all is to select a recognition result with a highest individual confidence. In this example, the combined confidence would be the expected number of correct recognition results counted during training when the system had a similar condition of no overlap and similar given confidence values. Similar counts and statistics also can be estimated for given amounts of partial overlap in recognition results. Therefore, the overall system can assign a higher confidence value to a combination of partially overlapping recognition results, since/if the degree of overlap is correlated to fewer overall recognition errors during training.

For example, various forms of the flows shown above may be used, with steps re-ordered, added, or removed. Also, although several applications and methods for using multiple speech recognition systems in speech decoding have been described, it should be recognized that numerous other applications are contemplated. Accordingly, other embodiments are within the scope of the following claims.

What is claimed is:

1. A computer-implemented method comprising:
receiving an audio signal at a plurality of automatic speech recognition systems (SRSs);
generating at each of the SRSs, a plurality of speech recognition results and corresponding confidence values for a speech recognition task initiated at each of the SRSs;
receiving the plurality of speech recognition results and the corresponding confidence values for the plurality of speech recognition results at a computer;
generating, by the computer, weighted confidence values for the speech recognition results wherein a weighted confidence value for a plurality of same particular speech recognition results generated by a subset of the SRSs is obtained by:
first, calculating an average of the confidence values each corresponding to a respective one of the plurality of same particular speech recognition results to obtain an average confidence value for the plurality of same particular speech recognition results, and
next, weighting the average confidence value by a predetermined weight assigned to a number of the plurality of same particular speech recognition results to obtain the weighted confidence value for the plurality of same particular speech recognition results, wherein the number of the plurality of same particular speech recognition results provides a frequency of generation of the same particular speech recognition result for the received audio signal;
ranking, by the computer, the speech recognition results according to their corresponding weighted confidence values; and
generating, by the computer, a final speech recognition result for the received audio signal based on the ranked speech recognition results.

2. The computer-implemented method of claim 1, wherein each of the plurality of same particular speech recognition results is obtained from a different one of the subset of the SRSs.

3. The computer-implemented method of claim 1, wherein a combination of the confidence values is further weighted based on a distribution of the confidence values obtained from the subset of the SRSs that generated the plurality of same particular speech recognition results.

4. The computer-implemented method of claim 1, wherein a combination of the confidence values is further weighted based on one or more characteristics of the subset of the SRSs that generated the plurality of same particular speech recognition results.

5. The computer-implemented method of claim 4, wherein the one or more characteristics include one or more characteristics selected from a group consisting of one or more overall levels of accuracy for a respective SRS of the subset of the SRSs that generated the plurality of same particular speech recognition results, one or more contextual levels of accuracy within a context for the audio signal for the respective SRS, and one or more temporal levels of accuracy for one or more periods of time for the respective SRS.

6. The computer-implemented method of claim 1, wherein a combination of the confidence values is further weighted based on a level of similarity between respective SRSs of the subset of the SRSs that generated the plurality of same particular speech recognition results.

7. The computer-implemented method of claim 1, wherein a combination of the confidence values is further weighted based on error rates of the subset of the SRSs that generated the plurality of same particular speech recognition results.

8. A device, comprising:
processing circuitry configured to
receive an audio signal at a plurality of automatic speech recognition systems (SRSs),
generate at each of the SRSs, a plurality of speech recognition results and corresponding confidence values for a speech recognition task initiated at each of the SRSs,
generate weighted confidence values for the speech recognition results, wherein a weighted confidence value for a plurality of same particular speech recognition results generated by a subset of the SRSs is obtained by:
first, calculating an average of the confidence values each corresponding to a respective one of the plurality of same particular speech recognition results to obtain an average confidence value for the plurality of same particular speech recognition results, and
next, weighting the average confidence value by a predetermined weight assigned to a number of the plurality of same particular speech recognition results to obtain the weighted confidence value for the plurality of same particular speech recognition results, wherein the number of the plurality of same particular speech recognition results provides a frequency of generation of the same particular speech recognition result for the received audio signal,
rank the speech recognition results according to their corresponding weighted confidence values, and
generate a final speech recognition result for the received audio signal based on the ranked speech recognition results.

9. The device of claim 8, wherein each of the plurality of same particular speech recognition result is obtained from a different one of the subset of the SRSs.

10. The device of claim 8, wherein a combination of the confidence values is further weighted based on one or more characteristics of the subset of the SRSs that generated the plurality of same particular speech recognition results.

11. The device of claim 8, wherein a combination of the confidence values is further weighted based on a level of similarity between respective SRSs of the subset of the SRSs that generated the plurality of same particular speech recognition results.

12. A computer program product embodied in a computer readable storage device storing instructions that, when executed, cause a computer to perform operations comprising:
    receiving an audio signal at a plurality of automatic speech recognition systems (SRSs);
    generating at each of the SRSs, a plurality of speech recognition results and corresponding confidence values for a speech recognition task initiated at each of the SRSs;
    receiving the plurality of speech recognition results and the corresponding confidence values for the plurality of speech recognition results at a computer;
    generating, by the computer, weighted confidence values for the speech recognition results, wherein a weighted confidence value for a plurality of same particular speech recognition results generated by a subset of the SRSs is obtained by:
        first, calculating an average of the confidence values each corresponding to a respective one of the plurality of same particular speech recognition results to obtain an average confidence value for the plurality of same particular speech recognition results, and
        next, weighting the average confidence value by a predetermined weight assigned to a number of the plurality of same particular speech recognition results to obtain the weighted confidence value for the plurality of same particular speech recognition results, wherein the number of the plurality of same particular speech recognition results provides a frequency of generation of the same particular speech recognition result for the received audio signal;
    ranking, by the computer, the speech recognition results according to their corresponding weighted confidence values; and
    generating, by the computer, a final speech recognition result for the received audio signal based on the ranked speech recognition results.

\* \* \* \* \*